(12) United States Patent
Kusunose et al.

(10) Patent No.: US 10,079,491 B2
(45) Date of Patent: Sep. 18, 2018

(54) DISPERSED POWER SUPPLY SYSTEM AND POWER CONDITIONER

(71) Applicant: KYOCERA Corporation, Kyoto-shi, Kyoto (JP)

(72) Inventors: Tomonari Kusunose, Higashiomi (JP); Yuusuke Nagou, Shinagawa-ku (JP)

(73) Assignee: KYOCERA Corporation, Kyoto (JP)

( * ) Notice: Subject to any disclaimer, the term of this patent is extended or adjusted under 35 U.S.C. 154(b) by 158 days.

(21) Appl. No.: 14/915,619

(22) PCT Filed: Aug. 27, 2014

(86) PCT No.: PCT/JP2014/004409
§ 371 (c)(1),
(2) Date: Feb. 29, 2016

(87) PCT Pub. No.: WO2015/029431
PCT Pub. Date: Mar. 5, 2015

(65) Prior Publication Data
US 2016/0241040 A1  Aug. 18, 2016

(30) Foreign Application Priority Data
Aug. 30, 2013 (JP) .................. 2013-179971

(51) Int. Cl.
*H02J 3/38* (2006.01)
*H02M 1/08* (2006.01)
*H02M 1/00* (2006.01)

(52) U.S. Cl.
CPC .............. *H02J 3/383* (2013.01); *H02J 3/382* (2013.01); *H02M 1/08* (2013.01); *H02J 3/387* (2013.01); *H02M 2001/0009* (2013.01)

(58) Field of Classification Search
None
See application file for complete search history.

(56) References Cited

U.S. PATENT DOCUMENTS

| 8,578,184 B2 | 11/2013 | Nishimura et al. |
| 2011/0107123 A1 | 5/2011 | Nishimura et al. |

FOREIGN PATENT DOCUMENTS

| EP | 1 361 639 A1 | 11/2003 |
| JP | H11-46458 | 2/1999 |

(Continued)

OTHER PUBLICATIONS

Extended European Search Report dated Mar. 27, 2017, issued by the European Patent Office in counterpart European Patent Application No. 14 83 9163.4.

(Continued)

*Primary Examiner* — Thienvu Tran
*Assistant Examiner* — David M Stables
(74) *Attorney, Agent, or Firm* — Procopio Cory Hargreaves and Savitch LLP (57) ABSTRACT

The disclosed dispersed power supply system includes a power conditioner configured to control output of a power supply apparatus, a current sensor, another power conditioner configured to control output of another power supply apparatus and another current sensor, and when a forward power flow threshold for preventing a reverse power flow of the power conditioner is lower than that of another power conditioner, the power conditioner controls the output of the power supply apparatus to adjust the forward power flow that is higher than the forward power flow threshold to the forward power flow threshold, and then, if the forward power flow is higher than the forward power flow threshold when another power conditioner controls the output of another power supply apparatus based on another forward power flow threshold, increases the forward power flow threshold.

7 Claims, 7 Drawing Sheets

(56) References Cited

FOREIGN PATENT DOCUMENTS

| | | | |
|---|---|---|---|
| JP | 2010-273407 | A | 12/2010 |
| JP | 2010273407 | A * | 12/2010 |
| WO | 2008/041311 | A1 | 4/2008 |
| WO | 2009/157342 | A1 | 12/2009 |
| WO | 2012/090709 | A1 | 7/2012 |
| WO | 2013088798 | A1 | 6/2013 |
| WO | 2015/029431 | A1 | 5/2015 |

OTHER PUBLICATIONS

International Search Report and Written Opinion of the International Searching Authority issued by the Japanese Patent Office for International Application No. PCT/JP2014/004409.

* cited by examiner

|  | First threshold [W] | General load 100[W] | | | Second threshold [W] |
|---|---|---|---|---|---|
|  |  | First output [W] | Forward power flow [W] | Second output [W] |  |
| T1 | 22 | 0 | 30 | 70 | 30 |
| T2 | 22 | 8 | 22 | 70 | 30 |
| T3 | 22 | 8 | 30 | 62 | 30 |
| T4 | 22 | 16 | 22 | 62 | 30 |
| T5 | 22 | 16 | 30 | 54 | 30 |
| T6 | 22 | 24 | 22 | 54 | 30 |
| T7 | 22 | 24 | 30 | 46 | 30 |
| T8 | 22 | 32 | 22 | 46 | 30 |
| T9 | 22 | 32 | 30 | 38 | 30 |
| T10 | 22 | 40 | 22 | 38 | 30 |
| T11 | 22 | 40 | 30 | 30 | 30 |
| T12 | 22 | 48 | 22 | 30 | 30 |
| T13 | 22 | 48 | 30 | 22 | 30 |
| T14 | 22 | 56 | 22 | 22 | 30 |
| T15 | 22 | 56 | 30 | 14 | 30 |
| T16 | 22 | 64 | 22 | 14 | 30 |
| T17 | 22 | 64 | 30 | 6 | 30 |
| T18 | 22 | 72 | 22 | 6 | 30 |
| T19 | 22 | 70 | 30 | 0 | 30 |
| T20 | 22 | 78 | 22 | 0 | 30 |

|  | First threshold [W] | General load 100[W] | | | Second threshold [W] |
|---|---|---|---|---|---|
|  |  | First output [W] | Forward power flow [W] | Second output [W] |  |
| T1 | 22 | 0 | 30 | 70 | 30 |
| T2 | 22 | 8 | 22 | 70 | 30 |
| T3 | 22 | 8 | 30 | 62 | 30 |
| T4 | 22 | 16 | 22 | 62 | 30 |
| T5 | 22 | 16 | 30 | 54 | 30 |
| T6 | 26 | 20 | 26 | 54 | 30 |
| T7 | 26 | 20 | 30 | 50 | 30 |
| T8 | 30 | 20 | 30 | 50 | 30 |
| T9 | 30 | 20 | 30 | 50 | 30 |
| T10 | 30 | 20 | 30 | 50 | 30 |

| | First threshold [W] | General load 100[W] | | | Second threshold [W] |
|---|---|---|---|---|---|
| | | First output [W] | Forward power flow [W] | Second output [W] | |
| T1 | 22 | 0 | 30 | 70 | 30 |
| T2 | 22 | 8 | 22 | 70 | 30 |
| T3 | 22 | 8 | 30 | 62 | 30 |
| T4 | 22 | 16 | 22 | 62 | 30 |
| T5 | 22 | 16 | 30 | 54 | 30 |
| T6 | 28 | 18 | 28 | 54 | 30 |
| T7 | 28 | 18 | 30 | 52 | 30 |
| T8 | 34 | 14 | 34 | 52 | 30 |
| T9 | 34 | 14 | 30 | 56 | 30 |
| T10 | 32 | 12 | 32 | 56 | 30 |
| T11 | 32 | 12 | 30 | 58 | 30 |
| T12 | 30 | 12 | 30 | 58 | 30 |
| T13 | 30 | 12 | 30 | 58 | 30 |
| T14 | 30 | 12 | 30 | 58 | 30 |

DISPERSED POWER SUPPLY SYSTEM AND POWER CONDITIONER

TECHNICAL FIELD

This disclosure relates to a dispersed power supply system and a power conditioner.

BACKGROUND

There exists a dispersed power supply system in which a natural energy type power supply system such as a solar cell, or the like, and a non-natural energy type power supply system such as a storage battery, a fuel battery, or the like, are interconnected to the same commercial power grid (hereinafter appropriately abbreviated to a grid) (for example, see PTL 1). Furthermore, a plurality of non-natural energy type power supply systems can be interconnected to the same grid to form a dispersed power supply system. Each power supply system can perform an interconnection operation in which the alternating current power is output through a grid interconnection and an independent operation in which the alternating current power is output independently of the grid in the event of a power failure of the grid.

In the case of a non-natural energy type power supply system, unlike a natural energy type power supply system such as solar power generation, permission from a power company is separately required to sell electric power to the grid. Note that, under the present regulations in Japan, it is specified that the power obtained from a non-natural energy type power supply system should be controlled so as not to be sold. Thus, in order to prevent reverse power flow to the grid (current in the direction of selling power), a current sensor is connected to each power conditioner of a non-natural energy type power supply system to detect current between the power supply system and the grid. In order to prevent selling power to the grid, each power conditioner controls so that a predetermined forward power (current in the direction of buying power) always flows in the current sensor. If the forward power flow is lower than a predetermined threshold (forward power flow threshold) during power supply to a load, each power conditioner decreases its own output to increase the forward power flow from the grid. In addition, if the forward power flow is higher than the forward power flow threshold, each power conditioner increases its own output to decrease the forward power flow from the grid.

CITATION LIST

Patent Literature

PTL 1: JPH1146458 (A)

SUMMARY

Technical Problem

When a plurality of power conditioners of a non-natural energy type power supply system is interconnected to the same grid, there is a need to install respective current sensors so that an output of a power conditioner will not be detected as a reverse power flow by a current sensor of another power conditioner. Thus, each of current sensors is installed on the grid side from a branch point to which each of power conditioners is connected, and thus detects the power from the grid as the same power (forward power flow).

Here, with respect to forward power flow thresholds of a plurality of power conditioners, different values are set depending on, for example, a type of a product, a manufacturer, or the like, and thresholds may not be discriminated from each other. When forward power flow thresholds are different from each other, only a specific power conditioner may output and other power conditioners may not output. As described above, each current sensor detects the same forward power flow, and allows a power conditioner whose forward power flow threshold is higher than the forward power flow to decrease the output, and allows a power conditioner whose forward power flow threshold is lower than the forward power flow to increase the output. Thus, as a result, output is concentrated on a power conditioner whose forward power flow threshold is low, and a power conditioner whose forward power flow threshold is high stops outputting. If such situation continues, it may cause harmful effects, such as a drastic decrease in SOH (State of Health) of a power supply apparatus on which output is concentrated, compared to the other power supply apparatus.

It would therefore be helpful to provide a dispersed power supply system that has a plurality of non-natural energy type power supply systems, and when forward power flow thresholds of each power conditioner are different from each other, can dissolve output difference between each power supply system, and a power conditioner.

Solution to Problem

A dispersed power supply system according to one embodiment of this disclosure includes:
a power conditioner configured to control an output of a power supply apparatus;
a current sensor connected to the power conditioner;
another power conditioner configured to control an output of another power supply apparatus; and
another current sensor connected to the another power conditioner,
wherein the current sensor and the another current sensor are installed on a position where current from a grid is detected as the same forward power flow; and
when a forward power flow threshold for preventing a reverse power flow of the power conditioner is different from another forward power flow threshold for preventing reverse power flow of the another power conditioner,
the power conditioner controls the output of the power supply apparatus to adjust the forward power flow that is higher than the forward power flow threshold to the forward power flow threshold, and then, if the forward power flow is higher than the forward power flow threshold when the another power conditioner controls the output of the another power supply apparatus based on the another forward power flow threshold, increases the forward power flow threshold.

A power conditioner according to one embodiment of this disclosure is a power conditioner that is connected to a current sensor to control an output of a power supply apparatus and is interconnected to the same grid as that of another power conditioner configured to control an output of another power supply apparatus,
wherein the current sensor and a current sensor of another power conditioner are installed on a position where a current from the grid is detected as the same forward power flow; and
the power conditioner has a controller configured to control, when a forward power flow threshold for preventing a reverse power flow of the power conditioner is different from another forward power flow threshold for preventing a reverse power flow of the another power conditioner, the output of the power supply apparatus to adjust the forward power flow that is higher than the forward power flow threshold to the forward power flow threshold, and then, if the forward power flow is higher than the forward power flow threshold when the another power conditioner controls the output of the another power supply apparatus based on the another forward power flow threshold, to increase the forward power flow threshold.

Advantageous Effect

In the disclosed dispersed power supply system and power conditioner, a plurality of non-natural energy type power supply systems are provided, and when forward power flow thresholds of each power conditioner are different from each other, output difference between power supply systems can be dissolved.

DETAILED DESCRIPTION

Detailed description of embodiments of this disclosure is given below with reference to drawings.

Figure 1:
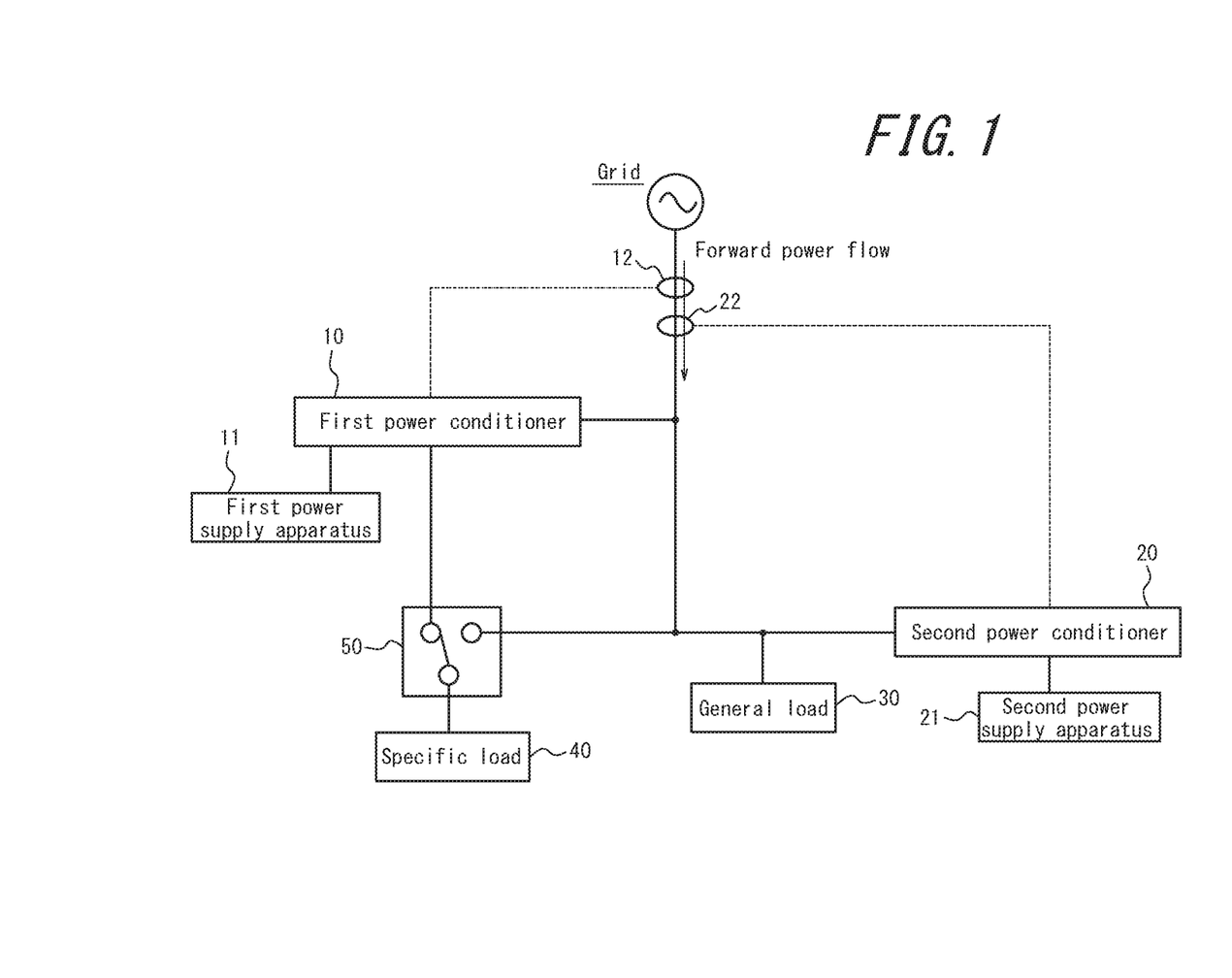
FIG. 1 is a diagram illustrating a configuration of a dispersed power supply system according to one embodiment of this disclosure.

A dispersed power supply system according to one embodiment of this disclosure has, as illustrated in FIG. 1, a first power supply system including a first power conditioner 10, a first power supply apparatus 11 and a first current sensor 12, a second power supply system including a second power conditioner 20, a second power supply apparatus 21 and a second current sensor 22, a general load 30, a specific load 40 and a switch 50 configured to switch a power supply source to the specific load 40. Here, the second power conditioner 20, the second power supply apparatus 21 and the second current sensor 22 correspond respectively to another power conditioner, another power supply apparatus and another current sensor in claims. In FIG. 1, the solid lines connecting each function block represent a wire that carries power. Furthermore, in FIG. 1, the dashed lines connecting each power conditioner and each current sensor represent flow of control signal or information to be communicated. Communications indicated by the dashed lines may be wired communication or wireless communication. For communication of control signal and information, various schemes including physical layers and logic layers can be adopted. For example, a communication by a short range communication scheme such as ZigBee® may be adopted. Furthermore, various transmission media such as infrared communication, power line communication (PLC), or the like, may be used. In addition, on a physical layer that is suitable for respective communications, various protocols, such as, for example, a communication protocol, such as, for example, ZigBee SEP2.0 (Smart Energy Profile 2.0), ECHONET Lite®, or the like, by which only a logic layer is specified may be operated.

In the present embodiment, the first power supply apparatus 11 of the first power supply system is a storage battery, and the second power supply apparatus 21 of the second power supply system is a fuel cell. The first power supply apparatus 11 (storage battery) can accumulate the power supplied from the grid or the power generated by a solar cell (not illustrated) or the like. The second power supply apparatus 21 (fuel cell) generates power through an electrochemical reaction of gas such as hydrogen and oxygen supplied from outside. As illustrated in the figure, the first current sensor 12 and the second current sensor 22 are installed on a position where the current from the grid is detected as the same forward power flow. The value detected by the first current sensor 12 is communicated to the first power conditioner 10. Furthermore, the value detected by the second current sensor 22 is communicated to the second power conditioner 20. Moreover, the first forward power flow threshold by which the first power conditioner 10 prevents reverse power flow and the second forward power flow threshold by which the second power conditioner 20 prevents reverse power flow are different values, and each power conditioner does not have information of the forward power flow threshold of the another power conditioner.

The general load 30 is a load normally used in households, offices, or the like, and is electrical equipment, such as, for example, a television, an air conditioner, a dryer, a vacuum, or the like. The specific load 40 is a load used for independent operation, such as during power failure of grid, and is electrical equipment such as, for example, an emergency lighting, or the like. The switch 50 is a switch configured to switch a power supply source to the specific load 40 by user operation. As illustrated in the figure, when the switch 50 is set on the side of the first power conditioner 10, it is advantageous in that, during the independent operation, power is supplied automatically from the first power conditioner 10 to the specific load 40 without user operation.

In the present embodiment, the first power conditioner 10 adjusts its own first forward power flow threshold, thereby performing control to resolve output difference between power conditioners. First of all, before explaining the output control method according to the embodiment of this disclosure, a conventional output control method in which a forward power flow threshold is not adjusted is explained. Note that, hereinafter, for simplification of explanation, the forward power flow and the forward power flow threshold are represented in watts (W). However, a person skilled in the art may appropriately measure and convert the current/power. The first forward power flow threshold of the first power conditioner 10 is 22 W, the second forward power flow threshold of the second power conditioner 20 is 30 W, and the power consumption of the general load 30 is 100 W. Then the influence of the output from the first power conditioner 10 to the specific load 40 is not taken into account. For the first power conditioner 10 and the second power conditioner 20, outputs thereof can respectively be adjusted in the range from zero to the maximum output (e.g. 2.5 kW) of each power supply apparatus. Note that, in each diagram, the output of the first power conditioner 10, the output of the second power conditioner 20, the first forward power flow threshold, the second forward power flow threshold, and the power from the grid are abbreviated respectively to the "first output," the "second output," the "first threshold," the "second threshold" and the "forward power flow." Furthermore, a processing step of each flow chart is performed by a controller that includes a suitable processor provided in each power conditioner.

Figure 2:
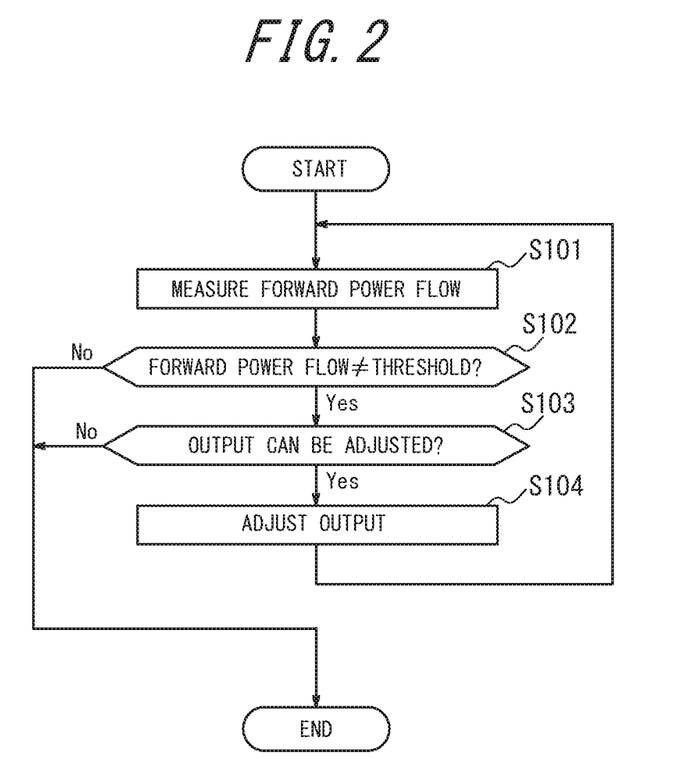
FIG. 2 is an output control flow chart of a conventional power conditioner.
Figure 3:
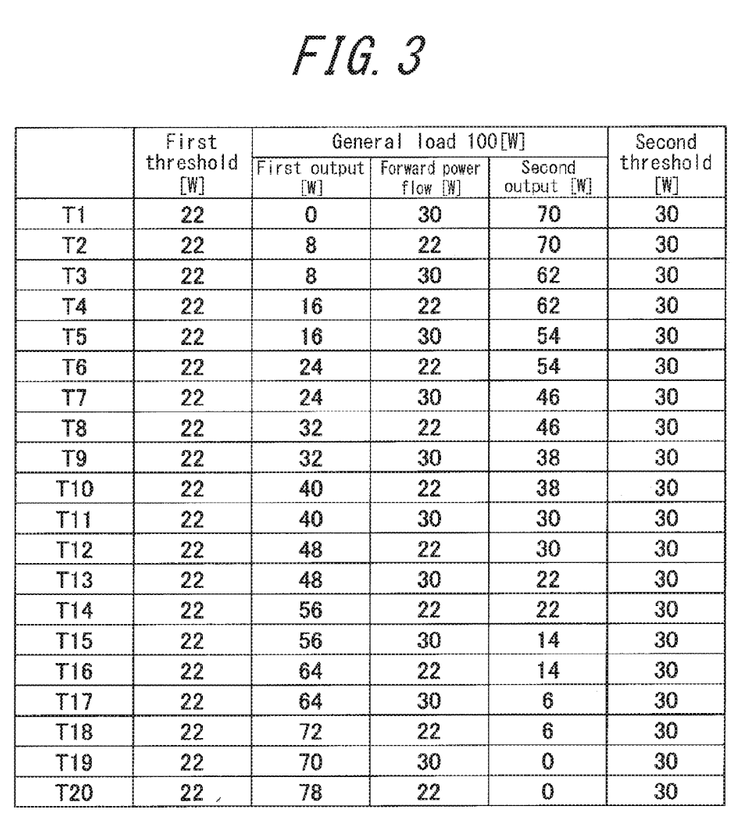
FIG. 3 is a diagram illustrating output changes by a conventional output control.

FIG. 2 is an output control flow of a conventional power conditioner and FIG. 3 is a diagram illustrating output changes by the conventional output control. At the initial state T1, the power (forward power flow) of 30 W from the grid and the output of 70 W from the second power conditioner 20 are supplied to the general load of 100 W. At this time, the first power conditioner 10 measures the forward power flow by the first current sensor 12 (step S101), and since the forward power flow of 30 W is higher than the first forward power flow threshold of 22 W (Yes at step S102), can afford to adjust the output of the first power supply apparatus 11 (Yes at step S103), thus increases output by the difference of 8 W so that the forward power flow of 30 W will be the same value as the first forward power flow threshold of 22 W (step S104). On the other hand, at state T2, the second power conditioner 20 measures the forward power flow by the second current sensor 22 (step S101), and since the forward power flow of 22 W is lower than the second forward power flow threshold of 30 W (Yes at step S102), can afford to adjust the output of the second power supply apparatus 21 (Yes at step S103), thus decreases the difference of 8 W so that the forward power flow 22 W will be the same value as the second forward power flow threshold of 30 W (step S104). In this manner, the first power conditioner 10 increases the output and the second power conditioner 20 decreases the output according to the forward power flow (T3 to T19), and as a result of that, at the final state T20, output (78 W) concentrates on the first power conditioner 10 and output difference can occur. At this final state T20, the output of the second power conditioner 20 is zero, and it is not possible to decrease the output below zero, thus the state where output cannot be adjusted (adjustment disabled state) can occur.

Figure 4:
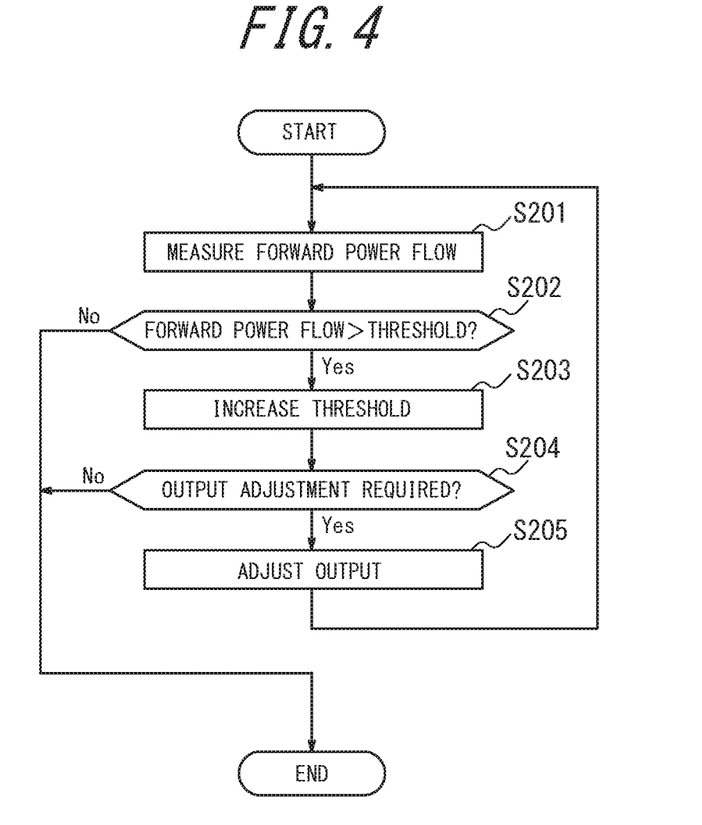
FIG. 4 is an output control flow chart according to a first embodiment of this disclosure.
Figure 5:
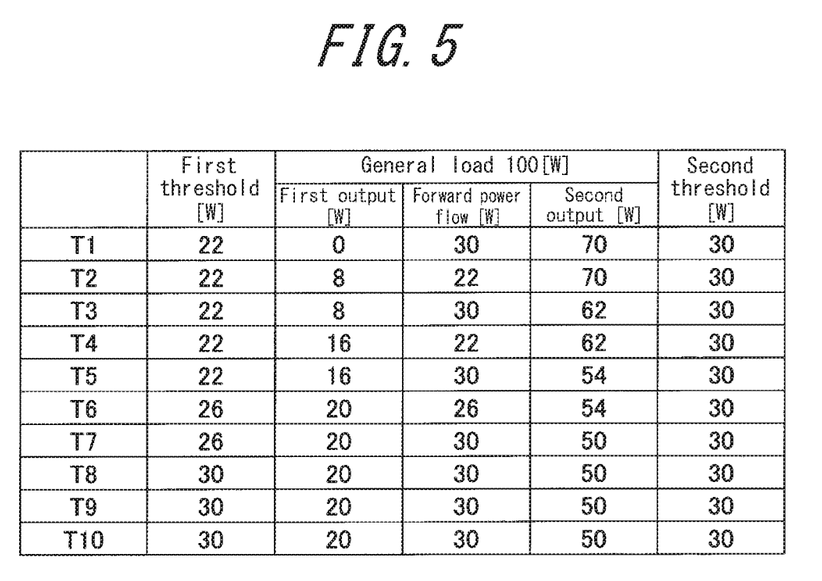
FIG. 5 is a diagram illustrating output changes by output control according to the first embodiment.

FIG. 4 is an output control flow of a power conditioner according to the first embodiment of this disclosure, and FIG. 5 is a diagram illustrating output changes by the output control according to the first embodiment. In the output control according to the first embodiment, the first power conditioner 10 controls the output of the first power supply apparatus 11 so that the forward power flow that is higher than the first forward power flow threshold will be adjusted to the first forward power flow threshold, and then, if the forward power flow is higher than the first forward power flow threshold, increases the first forward power flow threshold. Note that the second power conditioner 20 performs the conventional output control illustrated in FIG. 2.

The first power conditioner 10 performs, during states T1 to T4 illustrated in FIG. 5, the conventional output control as with the second power conditioner 20. This is because, as a cause for the forward power flow that is again higher than the first forward power flow threshold after the forward power flow is controlled to be adjusted to the first forward power flow threshold, besides the difference in the forward power flow threshold from the second power conditioner 20, various causes such as decline in the output of the second power conditioner, increase in the power consumption of the general load, or the like, can be considered. Note that, at the time of the initial setup, it is possible to switch to the output control flow according to the present embodiment illustrated in FIG. 4 by setting an administrator or the like.

The first power conditioner 10 determines, at the time of state T5, that the second forward power flow threshold of the second power conditioner 20 is different from its own first forward power flow threshold based on the periodicity of change of the forward power flow, and switches the processing to the output control flow illustrated in FIG. 4. Note that, the above described information on the periodicity of the forward power flow may be obtained by the controller of the first power conditioner 10. The first power conditioner 10 measures the forward power flow by the first current sensor 12 (step S201), and since the forward power flow of 30 W is higher than the first forward power flow threshold of 22 W (Yes at step S202), increases its own first forward power flow threshold to, for example, 26 W (step S203). Furthermore, the first power conditioner 10 confirms whether output adjustment of the first power supply apparatus 11 is required or not (Yes at step S204). Confirming whether output adjustment is required or not means determining whether output adjustment is required or not to allow the first forward power flow threshold of the first power conditioner 10 to be the same value as the forward power flow value. Next, the first power conditioner 10 increases the output by the difference of 4 W so that the forward power flow of 30 W will be the same value as the first forward power flow threshold of 26 W after the increase of threshold (step S205). The processing of the second power conditioner 20 at state T6 is the same as the flow illustrated in FIG. 2.

Here, a correction value used by the first power conditioner 10 to increase the first forward power flow threshold can be determined based on the difference between the forward power flow and the present first forward power flow threshold. For example, when the difference between the forward power flow and the present first forward power flow threshold is used directly as a correction value, the first power conditioner 10 may be able to immediately set the first forward power flow threshold to the same forward power flow threshold as that of the second power conditioner 20. Furthermore, the value obtained by dividing the difference between the forward power flow and the present first forward power flow threshold into two or more is used as a correction value, and the first forward power flow threshold can be increased in stages, thereby allowing the first forward power flow threshold to set to the same forward power flow threshold as that of the second power conditioner 20 while preventing the output fluctuation due to abrupt change in the first forward power flow threshold. Note that, when the first forward power flow threshold is increased in stages, it is not necessary to equalize a correction value at each stage and, for example, correction values in the former stage may be set high and those in the latter stage may gradually be decreased, thereby immediately allowing the first forward power flow threshold to be close to the second forward power flow threshold of the second power conditioner 20. Thus the same forward power flow threshold can be set more precisely.

At state T7, the first power conditioner 10 measures the forward power flow by the first current sensor 12 (step S201), and since the forward power flow of 30 W is higher than the first forward power flow threshold of 26 W (Yes at step S202), increases its own first forward power flow threshold to, for example, 30 W (step S203). In this case, since the forward power flow of 30 W is equal to the first forward power flow threshold of 30 W as a result of the increase in the threshold, output adjustment is not necessary (No at step S204).

At and after state T8, the first forward power flow threshold of the first power conditioner 10 and the second forward power flow threshold of the second power conditioner 20 are both 30 W, which is equal to the forward power flow, thus the output of the first power conditioner 10 and the output of the second power conditioner 20 can be stabilized. For example, the first power conditioner 10 increases the first forward power flow threshold, then at state T9, measures the forward power flow by the first current sensor 12 (step S201) and detects that the forward power flow of 30 W is equal to the first forward power flow threshold of 30 W (No at step S202). In this case, the first power conditioner 10 may stop increasing the forward power flow threshold and switch from the output control flow according to the present embodiment to the conventional output control flow illustrated in FIG. 2. Furthermore, after the output is stabilized, the first power conditioner 10 and the second power conditioner 20 can appropriately perform desired output.

In this manner, according to the present embodiment, the first power conditioner 10 increases the first forward power flow threshold if the forward power flow is higher than the first forward power flow threshold after controlling the output of the first power supply apparatus 11 so that the forward power flow that is higher than the first forward power flow threshold is adjusted to the first forward power flow threshold. Thus, when forward power flow thresholds of each power conditioner are different from each other, output difference between power supply systems can be resolved. In particular, output concentration on the power supply system having a smaller forward power flow threshold can be prevented, and the power supply system having a higher forward power flow threshold can be operated appropriately.

In addition, the first power conditioner 10 stops increasing the forward power flow threshold when the forward power flow is equal to the first forward power flow threshold after increasing the first forward power flow threshold. Thus, the forward power flow thresholds between dispersed power supply systems can be equalized, thereby allowing the output of each power supply system to be stabilized.

Figure 6:
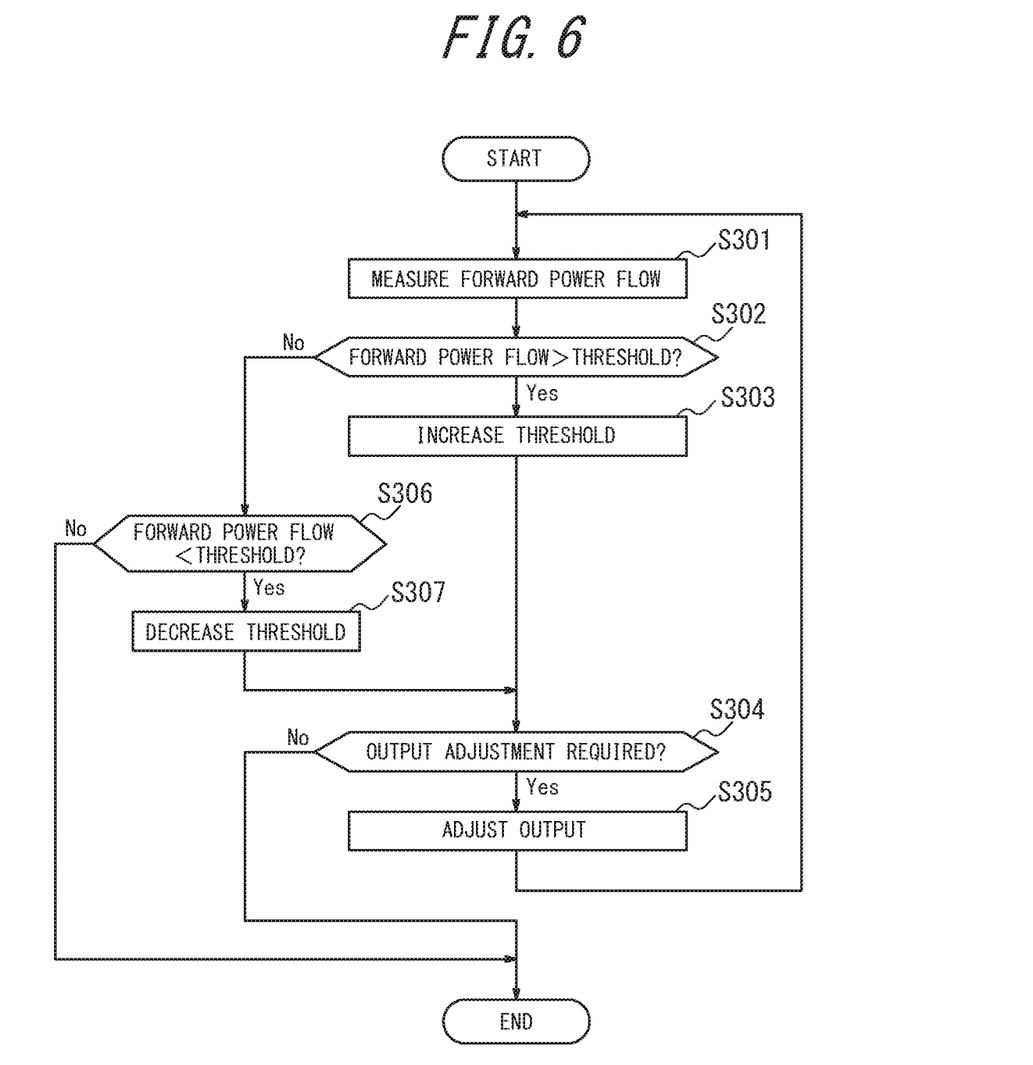
FIG. 6 is an output control flow chart according to a second embodiment of this disclosure.
Figure 7:
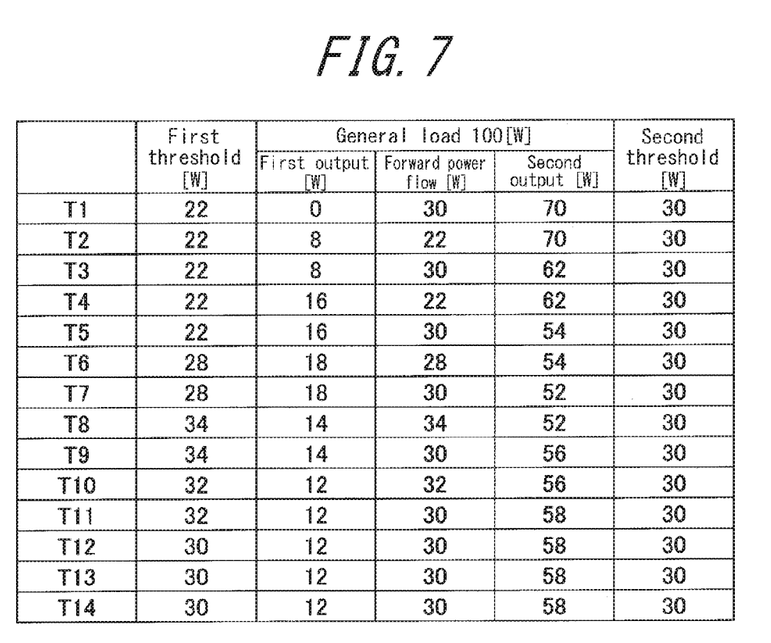
FIG. 7 is a diagram illustrating output changes by output control according to the second embodiment.

FIG. 6 is an output control flow chart of the power conditioner according to a second embodiment of this disclosure, and FIG. 7 is a diagram illustrating output changes by the output control according to the second embodiment. In the output control according to the second embodiment, the first power conditioner 10 controls the output of the first power supply apparatus 11 to adjust the forward power flow that is higher than the first forward power flow threshold to the first forward power flow threshold, and then, if the forward power flow is higher than the first forward power flow threshold, increases the first forward power flow threshold. Furthermore, the first power conditioner 10 increases the first forward power flow threshold, and then, if the forward power flow is lower than the first forward power flow threshold, decreases the first forward power flow threshold. Note that the second power conditioner 20 performs the conventional output control illustrated in FIG. 2. In addition, as in the case of the first embodiment, during states of T1 to T5, the first power conditioner 10 performs the conventional output control in the same manner as the second power conditioner 20.

The first power conditioner 10 determines, at state T5, that the second forward power flow threshold of the second power conditioner 20 is different from its own first forward power flow threshold based on the periodicity of the change of the forward power flow, and switches the processing to the output control flow according to the present embodiment illustrated in FIG. 6. The first power conditioner 10 measures the forward power flow by the first current sensor 12 (step S301), and since the forward power flow of 30 W is higher than the first forward power flow threshold of 22 W (Yes at step S302), increases its own first forward power flow threshold to, for example, 28 W (step S303). Furthermore, the first power conditioner 10 confirms whether output adjustment of the first power supply apparatus 11 is required or not (Yes at step S304), and increases the output by the difference of 2 W so that the forward power flow of 30 W will be the same value as the first forward power flow threshold of 28 W after the increase of threshold (step S305). The processing of the second power conditioner 20 at state T6 is the same as the flow illustrated in FIG. 2.

At state T7, the first power conditioner 10 measures the forward power flow by the first current sensor 12 (step S301), and since the forward power flow of 30 W is higher than the first forward power flow threshold of 28 W (Yes at step S302), increases its own first forward power flow threshold to, for example, 34 W (step S303). Furthermore, the first power conditioner 10 confirms whether output adjustment of the first power supply apparatus 11 is required or not (Yes at step S304), and decreases the output by the difference of 4 W so that the forward power flow of 30 W will be the same value as the first forward power flow threshold of 34 W after the increase of threshold (step S305). The processing of the second power conditioner 20 at state T8 is the same as the flow illustrated in FIG. 2.

At the time of state T9, the first power conditioner 10 measures the forward power flow by the first current sensor 12 (step S301), and since the forward power flow of 30 W is lower than the first forward power flow threshold of 34 W (No at step S302, Yes at step S306), decreases its own first forward power flow threshold to, for example, 32 W (step S307). Furthermore, the first power conditioner 10 confirms whether output adjustment of the first power supply apparatus 11 is required or not (Yes at step S304), and decreases the output by the difference of 2 W, so that the forward power flow of 30 W will be the same value as the first forward power flow threshold of 32 W after the decrease of threshold (step S305). The processing of the second power conditioner 20 at state T10 is the same as the flow illustrated in FIG. 2.

At the time of state T11, the first power conditioner 10 measures the forward power flow by the first current sensor 12 (step S301), and since the forward power flow of 30 W is lower than the first forward power flow threshold of 32 W (No at step S302, Yes at step S306), decreases its own first forward power flow threshold to, for example, 30 W (step S307). In this case, the first power conditioner 10 requires no output adjustment since the forward power flow of 30 W is equal to the first forward power flow threshold of 30 W after the increase of threshold (No at step S304).

At and after state T12, the first forward power flow threshold of the first power conditioner 10 and the second forward power flow threshold of the second power conditioner 20 are both 30 W, which is equal to the forward power flow, thus the output of the first power conditioner 10 and the output of the second power conditioner 20 can be stabilized. The first power conditioner 10 measures, for example, after decreasing the first forward power flow threshold, the forward power flow by the first current sensor 12 (step S301) at state T13, and detects that the forward power flow of 30 W is equal to the first forward power flow threshold of 30 W (No at step S302 and No at step S306). In this case, the first power conditioner 10 may stop decreasing the forward power flow threshold and switch from the output control flow according to the present embodiment to the conventional output control flow illustrated in FIG. 2. Furthermore, after the output is stabilized, the first power conditioner 10 and the second power conditioner 20 can appropriately perform desired output.

In this manner, according to the present embodiment, the first power conditioner 10 controls the output of the first power supply apparatus 11 so that the forward power flow that is higher than the first forward power flow threshold will be adjusted to the first forward power flow threshold, and then, if the forward power flow is higher than the first forward power flow threshold, increases the first forward power flow threshold. Furthermore, the first power conditioner 10 increases the first forward power flow threshold, and then, if the forward power flow is lower than the first forward power flow threshold, decreases the first forward power flow threshold. Thus, even if the lower forward power flow threshold is increased and the increased threshold exceeds the higher forward power flow threshold, the forward power flow threshold of each dispersed power supply system can be appropriately set equal. That is, output difference between each dispersed power supply system is suppressed, thereby allowing each power supply system to be operated in a stable manner.

In addition, the first power conditioner 10 controls the output of the first power supply apparatus 11 until the forward power flow is equal to the first forward power flow threshold, and then, may store the forward power flow value as a first forward power flow threshold. If the first power conditioner 10 operates, at the time of next startup, by replacing the forward power flow threshold with the stored first forward power flow threshold, the operation for increasing or decreasing the forward power flow threshold for equalization may be omitted from the second time on. Thus, effects such as decrease in the consumed power relating to increase/decrease in the forward power flow and to control (calculation) of determination of threshold, and stabilized output of the first power conditioner and the second power conditioner can be obtained. Note that, in consideration of errors or the like of the equipment, operation for increasing/decreasing the forward power flow threshold for equalization may be performed again by resetting the previous data after a lapse of a predetermined period of time.

Furthermore, the first power conditioner 10 may, after equalizing the forward power flow thresholds between the dispersed power supply systems, increase or decrease the first forward power flow threshold of the first power conditioner 10 relative to the reference threshold by using the second forward power flow threshold for preventing reverse power flow of the second power conditioner 20 as a reference threshold. This allows the output from only one of either the first power conditioner 10 or the second power conditioner 20.

Although this disclosure has been described based on various drawings and embodiments, it is to be noted that a person skilled in the art may easily perform various changes and modifications based on this disclosure. Therefore, such changes and modifications are to be understood as included within the scope of this disclosure. For example, the functions or the like included in each function and each step may be reordered in any logically consistent manner, and functions and steps may be combined into one or divided.

For example, in the above described embodiments, although the first power supply system and the second power supply system have been described as a storage battery system and a fuel cell system, respectively, this disclosure is not limited thereto, and is applicable to dispersed power supply systems that include any kinds of power supply system having various forward power flow thresholds different from each other. For example, it is apparent that this disclosure can be applied to, for example, a dispersed power supply system including two electricity storage systems having forward power flow thresholds different from each other.

REFERENCE SIGNS LIST

10 First power conditioner
11 First power supply apparatus
12 First current sensor
20 Second power conditioner (another power conditioner)
21 Second power supply apparatus (another power supply apparatus)
22 Second current sensor (another current sensor)
30 General load
40 Specific load
50 Switch

The invention claimed is:

1. A dispersed power supply system, comprising:
a power conditioner configured to control an output of a power supply apparatus;
a current sensor electrically connected to the power conditioner;
another power conditioner configured to control an output of another power supply apparatus; and
another current sensor electrically connected to the another power conditioner,
wherein
the current sensor and the another current sensor are installed on a position where current from a grid is detected as the same forward power flow,
when a forward power flow threshold for preventing a reverse power flow of the power conditioner is lower than another forward power flow threshold for preventing a reverse power flow of the another power conditioner, and
the power conditioner
controls the output of the power supply apparatus to adjust the forward power flow that is higher than the forward power flow threshold to the forward power flow threshold, and
then,
if the forward power flow is higher than the forward power flow threshold when the another power conditioner controls the output of the another power supply apparatus based on the another forward power flow threshold, increases the forward power flow threshold, and,
if the forward power flow is lower than the forward power flow threshold when the another power conditioner controls the output of the another power supply apparatus based on the another forward power flow threshold, decreases the forward power flow threshold.

2. The dispersed power supply system according to claim 1, wherein the power conditioner increases the forward power flow threshold, and then, if the forward power flow is equal to the forward power flow threshold, stops increasing the forward power flow threshold.

3. The dispersed power supply system according to claim 2, wherein the power conditioner increases the forward power flow threshold, and then, if the forward power flow is lower than the forward power flow threshold, decreases the forward power flow threshold.

4. The dispersed power supply system according to claim 1, wherein the power conditioner increases the forward power flow threshold, and then, if the forward power flow is lower than the forward power flow threshold, decreases the forward power flow threshold.

5. A power conditioner that is electrically connected to a current sensor to control an output of a power supply apparatus and is interconnected to the same grid as that of another power conditioner configured to control an output of another power supply apparatus, wherein
 the current sensor and another current sensor of the another power conditioner are installed on a position where a current from the grid is detected as the same forward power flow, and
 the power conditioner comprising a controller configured to
  control, when a forward power flow threshold for preventing a reverse power flow of the power conditioner is lower than another forward power flow threshold for preventing a reverse power flow of the another power conditioner, the output of the power supply apparatus to adjust the forward power flow that is higher than the forward power flow threshold to the forward power flow threshold, and then,
  if the forward power flow is higher than the forward power flow threshold when the another power conditioner controls the output of the another power supply apparatus based on the another forward power flow threshold, increase the forward power flow threshold, and,
  if the forward power flow is lower than the forward power flow threshold when the another power conditioner controls the output of the another power supply apparatus based on the another forward power flow threshold, decrease the forward power flow threshold.

6. The power conditioner according to claim 5, wherein the controller increases the forward power flow threshold, and then, if the forward power flow is equal to the forward power flow threshold, stops increasing the forward power flow threshold.

7. The power conditioner according to claim 5, wherein the controller increases the forward power flow threshold, and then, if the forward power flow is lower than the forward power flow threshold, decreases the forward power flow threshold.

* * * * *